United States Patent
Fujihara (10) Patent No.: US 11,264,612 B2
(45) Date of Patent: Mar. 1, 2022

(54) POSITIVE ELECTRODE COMPOSITION FOR NON-AQUEOUS SECONDARY BATTERY COMPRISING TITANIUM BORIDE PARTICLES

(71) Applicant: NICHIA CORPORATION, Anan (JP)

(72) Inventor: Keisuke Fujihara, Tokushima (JP)

(73) Assignee: NICHIA CORPORATION, Anan (JP)

( * ) Notice: Subject to any disclaimer, the term of this patent is extended or adjusted under 35 U.S.C. 154(b) by 166 days.

(21) Appl. No.: 16/524,477

(22) Filed: Jul. 29, 2019

(65) Prior Publication Data
US 2019/0348676 A1 Nov. 14, 2019

Related U.S. Application Data (62) Division of application No. 15/297,575, filed on Oct. 19, 2016, now Pat. No. 10,411,259.

(30) Foreign Application Priority Data

Oct. 21, 2015 (JP) .................................. 2015-206901
Aug. 18, 2016 (JP) .................................. 2016-160349

(51) Int. Cl.
| | | |
|---|---|---|
| *H01M 4/00* | (2006.01) |
| *H01M 4/525* | (2010.01) |
| *H01M 4/04* | (2006.01) |
| *H01M 4/505* | (2010.01) |
| *H01M 10/0525* | (2010.01) |
| *H01M 4/131* | (2010.01) |
| *H01M 4/1391* | (2010.01) |
| *H01M 4/62* | (2006.01) |

(52) U.S. Cl.
CPC ......... *H01M 4/525* (2013.01); *H01M 4/0471* (2013.01); *H01M 4/131* (2013.01); *H01M 4/1391* (2013.01); *H01M 4/505* (2013.01); *H01M 4/62* (2013.01); *H01M 10/0525* (2013.01); *Y02T 10/70* (2013.01)

(58) Field of Classification Search
CPC ........ H01M 4/521; H01M 4/525; H01M 4/48; H01M 4/0471; H01M 4/131; H01M 4/1391; H01M 4/505; H01M 4/62; H01M 10/0525; Y02T 10/7011
See application file for complete search history.

(56) References Cited

U.S. PATENT DOCUMENTS

| | | | |
|---|---|---|---|
| 2012/0052392 A1 | 3/2012 | Takeuchi et al. | |
| 2013/0277604 A1 | 10/2013 | Shimokita et al. | |
| 2016/0149211 A1* | 5/2016 | Hart ...................... | H01M 4/382 429/103 |

FOREIGN PATENT DOCUMENTS

| | | | | |
|---|---|---|---|---|
| JP | H08-222219 A | 8/1996 | | |
| JP | 2000-299107 A | 10/2000 | | |
| JP | 2012-048838 | * | 3/2012 | ............ H01M 4/525 |
| JP | 2012-048838 A | 3/2012 | | |
| JP | 2013-239434 A | 11/2013 | | |

* cited by examiner

*Primary Examiner* — Raymond Alejandro
(74) *Attorney, Agent, or Firm* — Hunton Andrews Kurth LLP (57) ABSTRACT

A positive electrode composition for a non-aqueous secondary battery, including: titanium boride particles; and a positive electrode active material comprising lithium transition metal complex oxide particles that comprise nickel in a composition and have a layered structure. The titanium boride particles comprise an oxygen component in a content of greater than or equal to 1.5 wt % and less than or equal to 2.9 wt %. A content of the titanium boride particles relative to the lithium transition metal complex oxide particles is less than or equal to 1.5 mol % in titanium equivalent terms.

8 Claims, 3 Drawing Sheets

POSITIVE ELECTRODE COMPOSITION FOR NON-AQUEOUS SECONDARY BATTERY COMPRISING TITANIUM BORIDE PARTICLES

CROSS-REFERENCE TO RELATED APPLICATIONS

This is a divisional application of U.S. patent application Ser. No. 15/297,575, filed Oct. 19, 2016, now U.S. Pat. No. 10,411,259, which claims benefit of Japanese Patent Application No. 2015-206901, filed on Oct. 21, 2015 and Japanese Patent Application No. 2016-160349, filed on Aug. 18, 2016, the entire disclosures of which are incorporated herein by reference.

BACKGROUND

Technical Field

The present disclosure relates to a composition for use for a positive electrode of a non-aqueous secondary battery, such as lithium-ion secondary battery, and a method of producing the same.

Description of Related Art

Non-aqueous secondary batteries, such as lithium-ion secondary batteries, are widely used as a power source of small devices such as mobile phones and notebook computers. Since a non-aqueous secondary battery can be operated at a higher average operating voltage, the use of non-aqueous secondary batteries as a source of electricity for driving large devices such as electric vehicles is now being studied.

For the positive electrode of a non-aqueous secondary battery, a lithium transition metal complex oxide, such as a lithium cobalt complex oxide, is usually used as an active material. A lithium transition metal complex oxide containing nickel as a transition metal (lithium nickel complex oxide) has a capacity per unit mass even larger than that of a lithium cobalt complex oxide. Thus, the use of a lithium nickel complex oxide as a positive electrode active material for a non-aqueous secondary battery for use as a source of electricity for driving large devices is expected.

There is also an example of a positive electrode composition obtained by mixing titanium boride with a positive electrode active material.

JP 2012-048838 A describes an example where a positive electrode active material composed of lithium transition metal complex oxide particles represented by the compositional formula $Li_{1.1}Ni_{0.3}Co_{0.4}Mn_{0.3}O_2$ is mixed with $TiB_2$ particles having an average particle diameter of 2 μm so that the resultant mixture have a molar ratio of 99:1. The document also describes an example where the resultant mixture is calcined to sinter $TiB_2$ particles on the surfaces of the lithium transition metal complex oxide particles.

JP H08-222219 A describes an example where 5 wt % of $TiB_2$ particles are fused on the surface of a positive electrode active material composed of a lithium nickel complex oxide. The fusion is said to have been achieved by applying mechanical energy to $TiB_2$ particles. The average particle diameter, the particle size, and the like of the $TiB_2$ particles are unclear.

SUMMARY

A method of producing a positive electrode composition for a non-aqueous secondary battery is provided. The method includes heat-treating titanium boride particles at a temperature ranging from 150° C. to 300° C. under an oxygen-containing atmosphere to obtain heat-treated particles and mixing the heat-treated particles with a positive electrode active material comprising lithium transition metal complex oxide particles that comprise nickel in a composition and have a layered structure such that a content of the heat-treated particles relative to the lithium transition metal complex oxide particles is 1.5 mol % or less in titanium equivalent terms. Using the resultant positive electrode composition can yield a non-aqueous secondary battery exhibiting superior charge-discharge characteristics, high-temperature storage characteristics, and cycle characteristic when charged with a high voltage.

DETAILED DESCRIPTION

Hereinafter, a positive electrode composition for a non-aqueous secondary battery and a method of producing the same according to the present disclosure will be described with reference to the embodiments shown below. The embodiments, however, exemplify the technical concept of the present disclosure, and the present disclosure is not limited to the positive electrode composition for a non-aqueous secondary battery and a method of producing the same described below. As used herein, the term "step" means not only an independent step but also a step which cannot be clearly distinguished from the other steps but can achieve the anticipated effect of that step. Further, for the amount of each component contained in a composition, when a plurality of substances corresponding to the component exist, the amount of the component means the total amount of the substances present in the composition unless otherwise specified. An average particle diameter of lithium transition metal complex oxide particles and that of titanium boride particles are each a median particle diameter obtained as a particle diameter (D50) at 50% cumulative volume from a minor diameter side of the particles in the particle size distribution obtained by the laser scattering method.

Method of Producing a Positive Electrode Composition for a Non-Aqueous Secondary Battery A method of producing a positive electrode composition for a non-aqueous secondary battery according to a first embodiment of the present disclosure may be characterized by including the following steps. The steps include heat-treating titanium boride particles at a temperature ranging from 150° C. to 300° C. under an oxygen-containing atmosphere to obtain heat-treated particles, and mixing the heat-treated particles with a positive electrode active material containing lithium transition metal complex oxide particles that contain nickel in the composition and have a layered structure so that the content of the heat-treated particles relative to the lithium transition metal complex oxide particles is 1.5 mol % or less in titanium equivalent terms. That is, the method may include the steps for obtaining heat-treated particles, and obtaining a positive electrode composition. The descriptions below will be mainly focused on these steps.

When a non-aqueous secondary battery is used as a source of electricity for driving large devices such as electric vehicles, the battery is often charged with a high charging voltage in order to increase its energy density. It has been found, however, that, when a non-aqueous secondary battery is charged with a charging voltage of as high as 4.3 V or more, the cycle characteristic, for example, of the battery can notably be deteriorated. This tendency is found to be greater, in particular, in a non-aqueous secondary battery containing a lithium nickel complex oxide as a positive electrode active material.

Using the positive electrode composition obtained by the method of producing a positive electrode composition for a non-aqueous secondary battery according to an embodiment of the present disclosure can yield a non-aqueous secondary battery exhibiting superior charge-discharge characteristics, high-temperature storage characteristics, and cycle characteristic when charged with a high voltage.

<Step for Obtaining Heat-Treated Particles>

In the step for obtaining heat-treated particles, titanium boride particles are heat-treated in an oxygen-containing atmosphere to yield heat-treated particles. Although, for example, a very thin layer of titanium oxide is formed on the surface of titanium boride particles before heat treatment, a thicker layer of titanium oxide is believed to be formed on the surface as a result of heat treatment in an oxygen atmosphere. Using a positive electrode composition containing the thus obtained heat-treated particles yields a battery with superior battery characteristics when charged with a high voltage, for example, of 4.3 V or more.

The purity of the titanium boride particles undergoing heat treatment is, in consideration of safety, for example, preferably 95 wt % or more, or more preferably 98 wt % or more. The average particle diameter of the titanium boride particles ranges from 1 μm to 4 μm, or from 2.5 μm to 3.5 μm as a median particle diameter in consideration, for example, of the cycle characteristic and high-temperature storage characteristics of the battery to be obtained.

The oxygen content in an oxygen-containing atmosphere is, for example, preferably 10 vol % or more, or more preferably 20 vol % or more. In consideration of productivity, the oxygen-containing atmosphere may contain another gas besides oxygen. Examples of the gas other than oxygen include an inert gas, such as nitrogen and argon. The oxygen-containing atmosphere may be an air atmosphere in consideration of productivity.

The heat-treatment temperature is preferably 150° C. or more, more preferably 180° C. or more, or most preferably 200° C. or more in consideration of the charge-discharge characteristics of the battery to be obtained. The heat-treatment temperature is also preferably 300° C. or less, more preferably 280° C. or less, or most preferably 250° C. or less in consideration of the high-temperature storage characteristics and cycle characteristic of the battery to be obtained. The heat-treating time should be set so that the oxygen content of the resulting titanium boride particles ranges, for example, from 1.6 wt % to 1.8 wt %. The heat-treating time may range, for example, from 5 hours to 15 hours. The titanium boride particles may be heat-treated, for example, in a box furnace.

The heat-treated titanium boride particles may contain an oxygen component. The content of the oxygen component is preferably 1.5 wt % or more, more preferably 1.6 wt % or more, or most preferably 1.7 wt % or more in oxygen equivalent terms in consideration of the charge-discharge characteristics of the battery to be obtained. The content of the oxygen component is also, for example, preferably 2.9 wt % or less, more preferably 2.5 wt % or less, or most preferably 2.0 wt % or less in consideration of the high-temperature storage characteristics and cycle characteristic of the battery to be obtained. The content of the oxygen component in the heat-treated particles is measured by using an oxygen-nitrogen analyzer. Note that the average particle diameter of the heat-treated particles is believed to be substantially the same as the average particle diameter of the titanium boride particles before heat-treatment.

Figure 1:
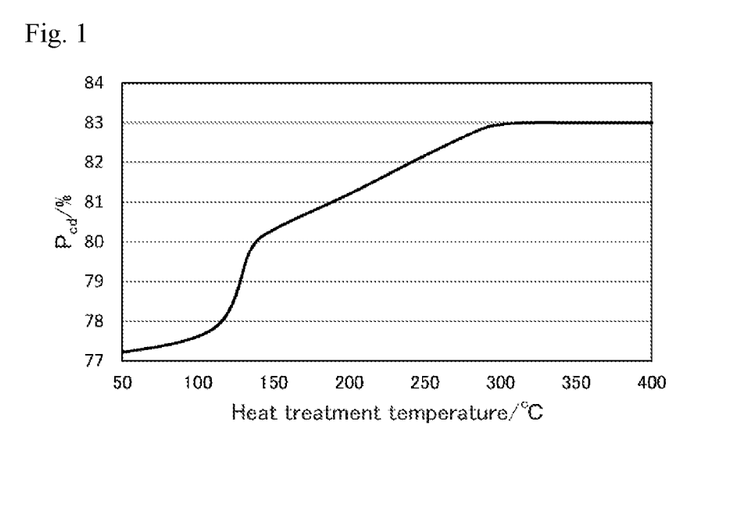
FIG. 1 shows an example of the relationship between the temperature for heat-treating titanium boride particles and the charge-discharge characteristic of the resulting non-aqueous secondary battery.

FIG. 1 is an example of a graph showing the relationship between the temperature for heat-treating titanium boride and the charge-discharge characteristic of the resulting non-aqueous electrolyte secondary battery prepared by using the relevant positive electrode composition according to the present embodiment. Here, the charge-discharge characteristic was evaluated by the charge-discharge efficiency $P_{cd}$ represented by the ratio of discharge capacity $Q_c$ to charge capacity $Q_d$, i.e., $Q_c/Q_d$, at a charging voltage of 4.5 V and a discharging voltage of 2.75 V. As is clear from FIG. 1, the charge-discharge characteristic is significantly improved when the heat-treatment temperature exceeds around 150° C. For this reason, the heat-treatment temperature is set at 150° C. or more.

Figure 2:
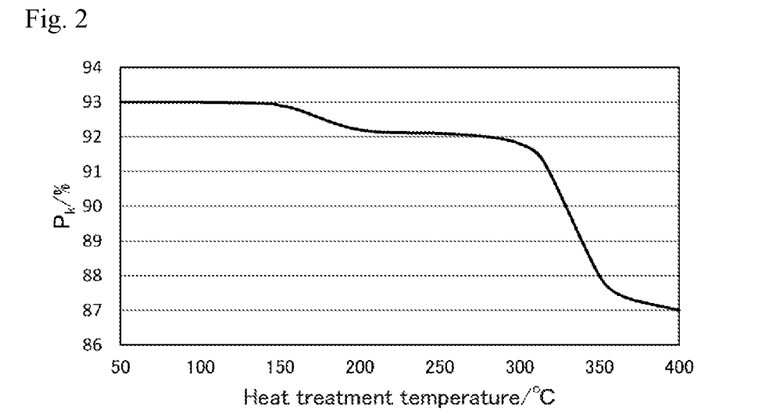
FIG. 2 shows an example of the relationship between the temperature for heat-treating titanium boride particles and a high-temperature storage characteristic ($P_k$) of the resulting non-aqueous secondary battery.

FIG. 2 is an example of a graph showing the relationship between the temperature for heat-treating titanium boride and a high-temperature storage characteristic ($P_k$) in the resulting non-aqueous electrolyte secondary battery prepared by using the relevant positive electrode composition according to the present embodiment. Here, the high-temperature storage characteristic was evaluated by the maintenance ratio of the discharged capacity, i.e., capacity maintenance ratio, i.e., $P_k$, before and after continuous trickle charging at a charging voltage of 4.4 V. As is clear from FIG. 2, the high-temperature storage characteristic tends to deteriorate when the heat-treatment temperature exceeds around 300° C. For this reason, the heat-treatment temperature is set at 300° C. or less.

Figure 3:
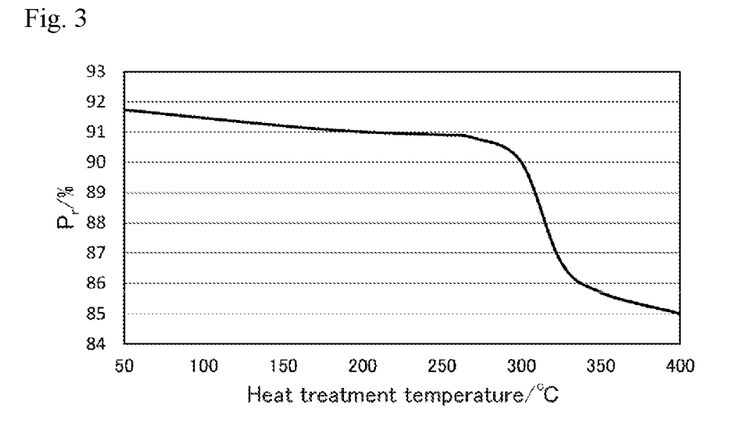
FIG. 3 shows an example of the relationship between the temperature for heat-treating titanium boride particles and another high-temperature storage characteristic ($P_r$) of the resulting non-aqueous secondary battery.

FIG. 3 is an example of a graph showing the relationship between the temperature for heat-treating titanium boride and another high-temperature storage characteristic ($P_r$) in the resulting non-aqueous electrolyte secondary battery prepared by using the relevant positive electrode composition according to the present embodiment. Here, the high-temperature storage characteristic ($P_r$) was evaluated by the maintenance ratio of the charge capacity before and after trickle-charging at a charging voltage of 4.4 V, discharging at a discharging voltage of 2.75 V, and charging at 4.4 V, that is, the high-temperature storage characteristic ($P_r$) is a reversion rate. As is clear from FIG. 3, the high-temperature storage characteristic ($P_r$) also tends to deteriorate when the heat-treatment temperature exceeds around 300° C.

Figure 4:
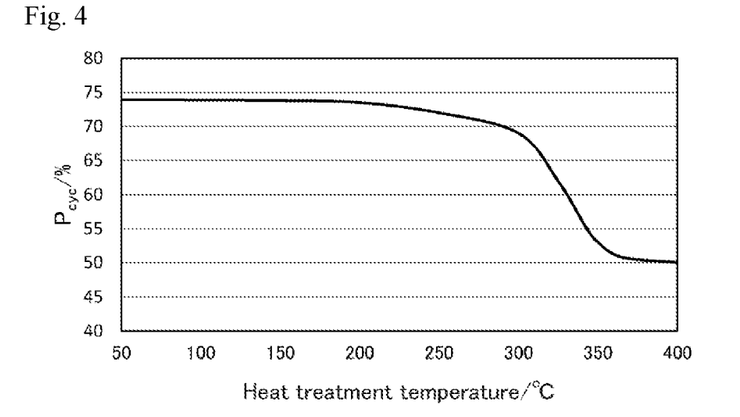
FIG. 4 shows an example of the relationship between the temperature for heat-treating titanium boride particles and the cycle characteristic of the resulting non-aqueous secondary battery.

FIG. 4 is an example of a graph showing the relationship between the temperature for heat-treating titanium boride and the cycle characteristic of the resulting non-aqueous electrolyte secondary battery prepared by using the relevant positive electrode composition according to the present embodiment. Here, the cycle characteristic was evaluated by the maintenance ratio of the discharge capacity by comparing the discharge capacity before and after repeating 100 times of charging at a charging voltage of 4.4 V and discharging at a discharging voltage of 2.75 V, that is, a capacity maintenance ratio $P_{cyc}$ after 100 cycles. As is clear from FIG. 4, the cycle characteristic also tends to deteriorate when the heat-treatment temperature exceeds around 300° C.

<Step of Obtaining a Positive Electrode Composition>

In the step of obtaining a positive electrode composition, heat-treated particles according to the above-described step are mixed with a specific positive electrode active material in a specific ratio to obtain a target positive electrode composition for a non-aqueous secondary battery.

[Positive Electrode Active Material]

The positive electrode active material contains, as a major component, lithium transition metal complex oxide that contains nickel as a transition metal and has a layered structure. Although the positive electrode active material may be substantially composed of lithium transition metal complex oxide that is contained as a main component, the positive electrode active material may contain other lithium transition metal complex oxide that is capable of releasing and adsorbing lithium ions. Examples of the other lithium transition metal complex oxide include a lithium cobalt complex oxide, a spinel-structured lithium manganese complex oxide, and an olivine-structured lithium iron phosphate. The content of the lithium transition metal complex oxide that contains nickel and has a layered structure in a positive electrode active material is, for example, preferably 90 wt % or more, or more preferably 95 wt % or more. When the positive electrode active material contains another lithium transition metal complex oxide, the content is, for example, preferably 10 wt % or less, or more preferably 5 wt % or less.

The lithium transition metal complex oxide particles containing nickel in its composition and having a layered structure (the main component) are, for example, represented by the formula: $Li_aNi_{1-x-y-z}Co_xMn_yM^1_zM^2_wO_2$. In the formula, $1.00 \leq a \leq 1.50$, $0.00 \leq x \leq 0.50$, $0.00 \leq y \leq 0.50$, $0.00 \leq z \leq 0.15$, $0.000 \leq w \leq 0.020$, and $x+y+z \leq 0.70$ are satisfied; $M^1$ is at least one element selected from the group consisting of Al and Mg; and $M^2$ is at least one element selected from the group consisting of Ti, Zr, W, Ta, Nb, and Mo.

As the amount of lithium in the lithium transition metal complex oxide particles (hereinafter also referred to as "the main component") increases, the output characteristic tends to improve, but the synthesis tends to become difficult. In view of this, the range of value a in the formula of the main component may be preferably $1.00 \leq a \leq 1.50$, more preferably $1.05 \leq a \leq 1.25$, or most preferably $1.05 \leq a \leq 1.15$.

The main component contains nickel as a transition metal. By containing nickel, for example, a charge-discharge capacity higher than that of a lithium cobalt complex oxide can be achieved.

A part of nickel in the main component may be replaced with cobalt. The amount of nickel to be replaced with cobalt may be appropriately determined according to the purposes other than the problem to be solved by the present disclosure. Note that, however, the production cost increases as the amount of cobalt increases. On the basis of this fact, the range of value x in the compositional formula of the main component is $0.00 \leq x \leq 0.50$. To strike a balance between various characteristics and production cost, the range of value x may be preferably $0.05 \leq x \leq 0.35$, more preferably $0.1 \leq x \leq 0.3$, or most preferably $0.15 \leq x \leq 0.25$.

A part of nickel in the main component may be replaced with manganese. The amount of nickel to be replaced with manganese may be appropriately determined according to the purposes other than the problem to be solved by the present disclosure. Note that, however, the discharge capacity decreases as the amount of manganese increases. On the basis of this fact, the range of value y in the compositional formula of the main component is $0.00 \leq y \leq 0.50$. In consideration of a balance among various characteristics of the battery to be obtained, the range of value y may be preferably $0.10 \leq y \leq 0.40$, more preferably $0.20 \leq y \leq 0.40$, or most preferably $0.25 \leq y \leq 0.35$.

A part of nickel in the main component may be replaced with at least one element $M^1$ selected from the group consisting of aluminum and magnesium. The amount of nickel to be replaced with the element $M^1$ may be appropriately determined according to the purposes other than the problem to be solved by the present disclosure. Note that, however, the element $M^1$ is a typical element, and contributes little to electrochemical reactions, so that the amount of nickel to be replaced with element $M^1$ may not be too much. On the basis of this fact, the range of value z in the compositional formula of the main component may be $0.00 \leq z \leq 0.30$. In consideration of a balance among various characteristics of the battery to be obtained, the range of value z may be preferably $0.00 \leq z \leq 0.15$.

In the main component, at least one element $M^2$ selected from the group consisting of titanium, zirconium, tungsten, tantalum, niobium, and molybdenum may further be contained. The amount of nickel to be replaced with the element $M^2$ may be appropriately determined according to the purposes other than the problem to be solved by the present disclosure. Note that, however, the amount of the element $M^2$ may not be too much, because the element $M^2$ can significantly distort the crystalline structure of the main component. On the basis of this fact, the range of value w in the compositional formula of the main component may be $0.000 \leq w \leq 0.050$. In consideration of a balance among various characteristics of the battery to be obtained, the range of value w may be preferably $0.000 \leq w \leq 0.020$.

The total amount of nickel to be replaced in the main component should be within a given range so that the main component can retain the benefit of being a lithium nickel-based complex oxide. If $x+y+z \leq 0.70$ is satisfied in the formula of the main component, the main component has the benefit of being a lithium nickel-based complex oxide. In consideration of a balance among various characteristics of the battery to be obtained, preferably $0.20 \leq x+y+z \leq 0.60$ may be satisfied, or more preferably $0.40 \leq x+y+z \leq 0.60$ may be satisfied.

The average particle diameter of the lithium transition metal complex oxide particles is, as the median particle diameter, for example, from 3 µm to 30 µm, or from 5 µm to 20 µm so that the active material is contained at a high density in the active material layer. The ratio of the average particle diameter of the lithium transition metal complex oxide particles to the average particle diameter of the titanium boride particles is, for example, from 0.75 to 30, or from 1 to 10 for homogeneous mixing.

[Mixing Ratio]

The content of the heat-treated particles relative to the lithium transition metal complex oxide particles is 1.5 mol % or less, 1.2 mol % or less, or 1.0 mol % or less in titanium equivalent terms in consideration of the charge-discharge characteristic of the battery to be obtained. The content of the heat-treated particles relative to the lithium transition metal complex oxide particles is also preferably 0.3 mol % or more, more preferably 0.4 mol % or more, or most preferably 0.5 mol % or more in titanium equivalent terms in consideration of the high-temperature storage characteristics and cycle characteristic of the battery to be obtained.

Figure 5:
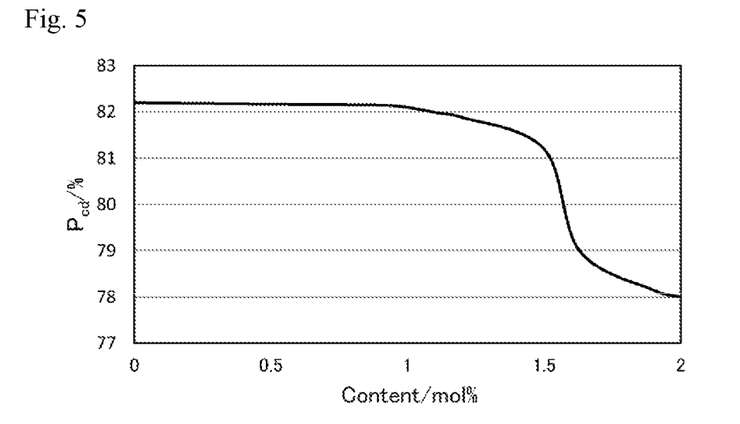
FIG. 5 shows an example of the relationship between the content of the heat-treated particles in a positive electrode composition for a non-aqueous secondary battery according to the present embodiment and the charge-discharge characteristic of the resulting non-aqueous secondary battery.

FIG. 5 is a graph showing the relationship between the content of the heat-treated particles and the charge-discharge characteristic of the resulting non-aqueous electrolyte secondary battery prepared by using the relevant positive electrode composition according to the present embodiment. Here, the content of the heat-treated particles relative to the main component is expressed in titanium equivalent terms. As is clear from FIG. 5, the charge-discharge characteristic deteriorates when the content of the heat-treated particles exceeds around 1.5 mol %. For this reason, the heat-treated particles are mixed with the positive electrode active material so that the content of the heat-treated particles relative to the main component is 1.5 mol % or less in titanium equivalent terms.

Figure 6:
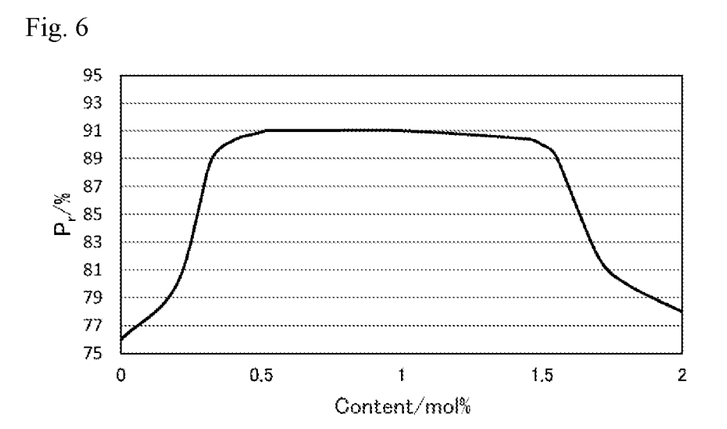
FIG. 6 shows an example of the relationship between the content of heat-treated particles in a positive electrode composition for a non-aqueous secondary battery according to the present embodiment and the high-temperature storage characteristic ($P_r$) of the resulting non-aqueous secondary battery.

FIG. 6 is a graph showing the relationship between the content of the heat-treated particles and the high-temperature storage characteristic ($P_r$) of the resulting non-aqueous electrolyte secondary battery prepared by using the relevant positive electrode composition according to the present embodiment. As is clear from FIG. 6, the high-temperature storage characteristic ($P_r$) tends to significantly improve when the content of the heat-treated particles exceeds around 0.3 mol %. For this reason, the heat-treated particles are preferably mixed with the positive electrode active material so that the content of the heat-treated particles may be 0.3 mol % or more relative to the main component in titanium equivalent terms.

Figure 7:
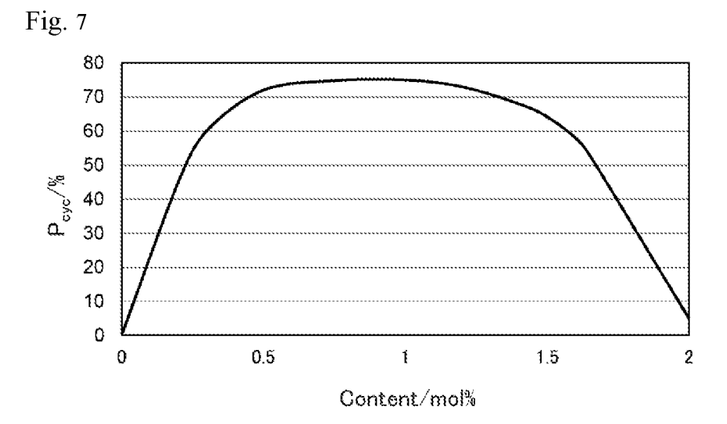
FIG. 7 shows an example of the relationship between the content of heat-treated particles in a positive electrode composition for a non-aqueous secondary battery according to the present embodiment and the cycle characteristic of the resulting non-aqueous secondary battery.

FIG. 7 is a graph showing the relationship between the content of the heat-treated particles and the cycle characteristic of the resulting non-aqueous electrolyte secondary battery prepared by using the relevant positive electrode composition according to the present embodiment. As is clear from FIG. 7, the cycle characteristic also tends to significantly improve when the content of the heat-treated particles exceeds around 0.3 mol %.

[Mixing Method]

The heat-treated particles and the positive electrode active material may be mixed by any mixing method with a force sufficiently strong but not excessively strong to cause chemical changes in these particles. An example is a method of mixing heat-treated particles and a positive electrode active material using a known mixer with blades.

In the production method of the present embodiment, heat-treated particles are mixed with a positive electrode active material to obtain a positive electrode composition. The mixing is performed in such a manner to minimize the occurrence of a chemical reaction between the heat-treated particles and the positive electrode active material, and also the occurrence of a physical alteration to the heat-treated particles and the positive electrode active material by the application of a mechanical or thermal energy. The resulting positive electrode composition is believed to contain the respective particles of the heat-treated particles and the lithium transition metal complex oxide particles that constitute a positive electrode active material as substantially independent particles. Here, being contained as substantially independent particles means that, for example, the heat-treated particles are not observed to be fused nor integrally sintered with the lithium transition metal complex oxide particles. Specifically, if, for example, the average particle diameter of the heat-treated particles is different from the average particle diameter of the lithium transition metal complex oxide particles, a peak derived from the heat-treated particles as well as a peak derived from the lithium transition metal complex oxide particles can be observed in the particle size distribution of the positive electrode composition. Furthermore, for example, by mapping the elements using a scanning electron microscope-energy dispersive X-ray spectroscopic analyzer, the heat-treated particles and the lithium transition metal complex oxide particles can be observed to be contained as substantially independent particles from each other.

Positive Electrode Composition for a Non-Aqueous Secondary Battery

A positive electrode composition for a non-aqueous secondary battery according to a second embodiment of the present disclosure contains titanium boride particles and a positive electrode active material. The positive electrode active material contains lithium transition metal complex oxide particles that contain nickel in the composition and have a layered structure. The titanium boride particles contain an oxygen component, and the content of the oxygen component ranges from 1.5 wt % to 2.9 wt %. The content of the titanium boride particles relative to the lithium transition metal complex oxide particles is 1.5 mol % or less in titanium equivalent terms. A non-aqueous secondary battery including a positive electrode prepared by using a positive electrode composition for a non-aqueous secondary battery according to the second embodiment exhibits superior charge-discharge characteristics, high-temperature storage characteristics, and cycle characteristic when charged with a high voltage.

The titanium boride particles contain an oxygen component, and the content of the oxygen component ranges from 1.5 wt % to 2.9 wt % in oxygen equivalent terms. The content of the oxygen component may be preferably 1.6 wt % or more, or more preferably 1.7 wt % or more in consideration of the charge-discharge characteristics of the battery to be obtained. The content of the oxygen component may also be preferably 2.5 wt % or less, more preferably 2.0 wt % or less, or more preferably 1.8 wt % or less in consideration of the high-temperature storage characteristics and cycle characteristic of the battery to be obtained. This is believed to be attributable to the fact that when the oxygen component contained in the titanium boride particles is, for example, present on the particle surface in the form of titanium oxide or the like, the rate at which titanium boride dissolves, for example, in an electrolyte is appropriately controlled. The presence of titanium oxide or the like on the surfaces of the titanium boride particles is believed to suppress a chemical reaction and/or a physical alteration that may otherwise occur when the titanium boride particles are mixed with the positive electrode active material. The titanium boride particles containing an oxygen component may be a commercially available product, or may be produced by heat-treating titanium boride particles in an oxygen-containing atmosphere. Using heat-treated titanium boride particles may allow the resulting battery to have further improved charge-discharge characteristics. The details of titanium boride particles are as described previously.

The positive electrode composition contains a positive electrode active material, and the positive electrode active material contains at least lithium transition metal complex oxide particles that contain nickel in the composition and have a layered structure. The details of the lithium transition metal complex oxide are as described previously.

The content of the titanium boride particles relative to the lithium transition metal complex oxide particles in the positive electrode composition is preferably 1.5 mol % or less, more preferably 1.2 mol % or less, or most preferably 1.0 mol % or less in titanium equivalent terms in consideration of the charge-discharge characteristic of the battery to be obtained. The content of the titanium boride particles relative to the lithium transition metal complex oxide particles may be preferably 0.3 mol % or more, more preferably 0.4 mol % or more, or most preferably 0.5 mol % or more in titanium equivalent terms in consideration of the high-temperature storage characteristics and cycle characteristic of the battery to be obtained. A positive electrode composition for a non-aqueous secondary battery is produced by the previously-described method, for example.

EXAMPLES

Examples will be described below. Note that the median particle diameter of the lithium transition metal complex oxide particles and that of the titanium boride particles are each an integrated value that constitutes 50% in the volume distribution obtained by the laser scattering method. As for the titanium boride particles, TIB2-NF (manufactured by Japan New Metals Co., Ltd.) was specifically used and the median particle diameter thereof was measured. The content of the oxygen component in the titanium boride particles (the percentage of the oxygen content) was measured using an oxygen-nitrogen analyzer (EMGA-820 manufactured by Horiba Ltd.).

Example 1

Titanium boride particles having a median particle diameter of 2.9 μm were heat-treated at 250° C. for 10 hours in the atmosphere to yield heat-treated particles. The oxygen content of the heat-treated particles was 1.8 wt %.

A complex hydroxide represented by $(Ni_{0.5}Co_{0.2}Mn_{0.3})(OH)_x$ (x=2-3) was obtained by a co-precipitation method. The resultant complex hydroxide and lithium carbonate were mixed to have a molar ratio of Li:(Ni+Co+Mn)=1.08:1 to yield a raw material mixture. The resultant raw material mixture was calcined at 850° C. for 2.5 hours in the air atmosphere, and subsequently calcined at 960° C. for 8 hours in the air atmosphere to obtain a sintered compact. The resultant sintered compact was pulverized and subjected to dry sieving to yield a positive electrode active material containing lithium transition metal complex oxide particles represented by the formula: $Li_{1.08}Ni_{0.5}Co_{0.2}Mn_{0.3}O_2$ and having a median particle diameter of 17 μm.

The resultant heat-treated particles were mixed with the resultant positive electrode active material using a high speed shear mixer such that the heat-treated particles was 1.0 mol % relative to the lithium transition metal complex oxide in titanium equivalent terms to yield a target positive electrode composition for a non-aqueous secondary battery.

Example 2

A target positive electrode composition for a non-aqueous secondary battery was obtained in the same manner as Example 1 except that the content of the heat-treated particles was 1.5 mol % relative to the lithium transition metal complex oxide in titanium equivalent terms.

Example 3

Titanium boride particles having a median particle diameter of 2.9 μm was heat-treated at 150° C. for 10 hours in the atmosphere to yield heat-treated particles. The oxygen content of the heat-treated particles was 1.5 wt %.

A positive electrode active material containing lithium transition metal complex oxide particles represented by the formula: $Li_{1.08}Ni_{0.5}Co_{0.2}Mn_{0.3}O_2$ and having a median particle diameter of 17 μm was obtained in the same manner as Example 1.

The resultant heat-treated particles were mixed with the resultant positive electrode active material using a high speed shear mixer such that the content of the heat-treated particles relative to the lithium transition metal complex oxide was 0.5 mol % in titanium equivalent terms to yield a target positive electrode composition for a non-aqueous secondary battery.

Example 4

A target positive electrode composition for a non-aqueous secondary battery was obtained in the same manner as Example 3 except that the titanium boride particles were heat-treated at 200° C. The oxygen content of the heat-treated titanium boride particles was 1.6 wt %.

Example 5

A target positive electrode composition for a non-aqueous secondary battery was obtained in the same manner as Example 3 except that the titanium boride particles were heat-treated at 250° C. The oxygen content of the heat-treated titanium boride particles was 1.8 wt %.

Example 6

A target positive electrode composition for a non-aqueous secondary battery was obtained in the same manner as Example 3 except that the titanium boride particles were heat-treated at 300° C. The oxygen content of the heat-treated titanium boride particles was 2.3 wt %.

Comparative Example 1

A target positive electrode composition for a non-aqueous secondary battery was obtained in the same manner as Example 3 except that the titanium boride particles were not heat-treated. The oxygen content of the titanium boride particles was 1.4 wt %.

Comparative Example 2

A target positive electrode composition for a non-aqueous secondary battery was obtained in the same manner as Example 3 except that the titanium boride particles were heat-treated at 350° C. The oxygen content of the heat-treated titanium boride particles was 3.0 wt %.

Comparative Example 3

A target positive electrode composition for a non-aqueous secondary battery was obtained in the same manner as Example 3 except that the titanium boride particles were heat-treated at 400° C. The oxygen content of the heat-treated titanium boride particles was 13.1 wt %.

Comparative Example 4

A target positive electrode composition for a non-aqueous secondary battery was obtained in the same manner as Example 1 except that the content of the heat-treated particles was 2.0 mol % relative to the lithium transition metal complex oxide particles in titanium equivalent terms.

Comparative Example 5

The positive electrode active material of Example 1 was used as a target positive electrode composition for a non-aqueous secondary battery.
<Preparation of Batteries for Evaluation>
The positive electrode compositions of Examples 1-6 and Comparative Examples 1-5 were each used to yield a non-aqueous electrolyte secondary battery according to the following manner.
[Preparation of a Positive Electrode]
85 parts by mass of a positive electrode composition, 10 parts by mass of acetylene black, and 5 parts by mass of polyvinylidene fluoride were dispersed in N-methylpyrrolidone to obtain a positive electrode slurry. The resultant positive electrode slurry was applied to a current collector made of aluminum foil. The resultant workpiece was dried before compression molding using a roll press machine, and cut into a predetermined size to yield a positive electrode.
[Preparation of a Negative Electrode]
97.5 parts by wt of artificial graphite, 1.5 parts by mass of carboxymethylcellulose, 1.0 part by mass of styrene-butadiene rubber were dispersed in water to yield a negative electrode slurry. The resultant negative electrode slurry was applied to a current collector made of copper foil. The resultant workpiece was dried before compression molding using a roll press machine, and cut into a predetermined size to yield a negative electrode.
[Preparation of a Non-Aqueous Electrolyte]
Ethyl carbonate and methyl ethyl carbonate were mixed in a volume ratio of 3:7 to yield a mixed solvent. Into the mixed solvent, lithium hexafluorophosphate was dissolved such that the concentration was 1.0 mol % to yield a non-aqueous electrolyte.
[Preparation of a Separator]
A separator made of porous polyethylene was prepared.
[Assembling of a Non-Aqueous Electrolyte Secondary Battery]
A lead electrode was attached to each of the current collector of the positive electrode and the current collector of the negative electrode, and the resultant positive and negative electrodes were vacuum-dried at 120° C. Subsequently, the above-described separator was disposed between the positive electrode and the negative electrode, which were then put into a laminated package in the form of a pouch. The pouch was then vacuum-dried at 60° C. to remove moisture adsorbed onto the respective members. After the vacuum drying, the above-described non-aqueous electrolyte was injected into a laminated package, and the package was sealed to yield a laminated non-aqueous electrolyte secondary battery as a battery for evaluation. The following battery characteristics were evaluated using each of the batteries for evaluation.
<Evaluation of Charge-Discharge Characteristics>
Constant current/constant voltage charging was performed at a charging voltage of 4.5 V and a charging current of 0.5 C (1 C (coulomb) is a current value capable of completing discharge from a full charge in one hour) to determine a charge capacity $Q_c$. Next, constant current discharging was performed with a discharging voltage of 2.75 V and a discharging current of 0.5 C to determine a discharge capacity $Q_d$. A charge-discharge efficiency $P_cd$ ($=Q_d/Q_c$) was calculated from the resultant $Q_c$ and $Q_d$.
<Evaluation of High-Temperature Storage Characteristics>
After performing constant-voltage charging at a charging voltage of 4.4 V, constant-voltage discharging was performed at a discharging voltage of 2.75 V to determine a discharge capacity $Q_d$ (0). Next, constant-voltage charging was performed at a charging voltage of 4.4 V to determine a charge capacity $Q_c$ (1). After the charging, each battery for evaluation was placed in a temperature-controlled bath at 60° C., and trickle charging at a charging voltage of 4.4 V was performed for 72 hours. After the trickle charging, constant-voltage discharging was performed at a discharging voltage of 2.75 V to determine a discharge capacity $Q_d$ (1). After the discharging, constant-voltage charging was performed at a charging voltage of 4.4 V to determine a charge capacity $Q_c$ (2). From the resultant $Q_d$ (0) and $Q_d$ (1), a capacity maintenance ratio $P_k$ ($=Q_d$ (1)/$Q_d$ (0)) was calculated. From the resultant $Q_c$ (1) and $Q_c$ (2), a reversion rate $P_r$ ($=Q_c$ (2)/$Q_c$ (1)) was calculated.
<Evaluation of Cycle Characteristic>
Each battery for evaluation was placed in a temperature-controlled bath at 45° C., and constant-voltage charging was performed at a charging voltage of 4.4 V. After the charging, constant-voltage discharging was performed at a discharging voltage of 2.75 V to determine a discharge capacity $Q_{dcyc}$ (1) at $1^{st}$ cycle. After repeating charging and discharging, a discharge capacity $Q_{cyc}$ (100) at $100^{th}$ cycle was measured. From the resultant $Q_{cyc}$ (1) and $Q_{cyc}$ (100), a capacity maintenance ratio $P_{cyc}$ ($=Q_{cyc}$ (100)/$Q_{cyc}$ (1)) after 100 cycles was calculated.

Table 1 shows the constituent features of the positive electrode compositions of Examples 1-6 and Comparative Examples 1-5, and Table 2 shows various battery characteristics of each battery for evaluation containing the relevant positive electrode composition.

TABLE 1

| | Content of titanium boride particles (mol %) | Heat treatment atmosphere | Heat treatment temperature (° C.) | Oxygen Content (%) |
|---|---|---|---|---|
| Example 1 | 1 | Air | 250 | 1.8 |
| Example 2 | 1.5 | Air | 250 | 1.8 |
| Example 3 | 0.5 | Air | 150 | 1.5 |
| Example 4 | 0.5 | Air | 200 | 1.6 |
| Example 5 | 0.5 | Air | 250 | 1.8 |
| Example 6 | 0.5 | Air | 300 | 2.3 |
| Comparative Example 1 | 0.5 | — | — | 1.4 |
| Comparative Example 2 | 0.5 | Air | 350 | 3.0 |
| Comparative Example 3 | 0.5 | Air | 400 | 13.1 |

TABLE 1-continued

|  | Content of titanium boride particles (mol %) | Heat treatment atmosphere | Heat treatment temperature (° C.) | Oxygen Content (%) |
|---|---|---|---|---|
| Comparative Example 4 | 2 | Air | 250 | 1.8 |
| Comparative Example 5 | — | — | — | — |

TABLE 2

|  | Charge/discharge characteristics | | | Storage characteristics at high voltage and high temperature | | Cycle characteristic |
|---|---|---|---|---|---|---|
|  | $Q_c/$ mAhg$^{-1}$ | $Q_d/$ mAhg$^{-1}$ | $P_{cd}/$ % | $P_k/$ % | $P_r/$ % | $P_{cyc}/$ % |
| Example 1 | 216 | 177 | 82 | 92 | 91 | 75 |
| Example 2 | 216 | 175 | 81 | 91 | 90 | 64 |
| Example 3 | 219 | 176 | 80 | 93 | 91 | 74 |
| Example 4 | 218 | 177 | 81 | 92 | 91 | 74 |
| Example 5 | 217 | 178 | 82 | 92 | 91 | 72 |
| Example 6 | 216 | 179 | 83 | 92 | 90 | 69 |
| Comparative Example 1 | 223 | 172 | 77 | 93 | 92 | 74 |
| Comparative Example 2 | 215 | 179 | 83 | 88 | 86 | 53 |
| Comparative Example 3 | 215 | 179 | 83 | 87 | 85 | 50 |
| Comparative Example 4 | 215 | 179 | 83 | 90 | 78 | 5 |
| Comparative Example 5 | 216 | 178 | 82 | 81 | 76 | 0 |

The results shown in Tables 1 and 2 indicate the following. A battery for evaluation prepared by using the positive electrode composition of Comparative Example 5 without mixing heat-treated particles is poor in terms of high-temperature storage characteristics and cycle characteristic compared to those of batteries for evaluation prepared by using a positive electrode composition of Examples 1-6.

Batteries for evaluation respectively prepared by using the positive electrode composition of Comparative Example 2 and the positive electrode composition of Comparative Example 3 (which were obtained by mixing heat-treated particles that were not heat-treated at an appropriate temperature) are poor in terms of cycle characteristic compared to those of batteries for evaluation respectively prepared by using the positive electrode compositions of Example 1-6 (which were prepared by mixing heat-treated particles that were heat-treated at an appropriate temperature).

A battery for evaluation prepared by using a positive electrode composition of Comparative Example 4 (which was obtained by mixing excessively heat-treated particles) is poor in terms of reversion rate $P_r$, which is one of the high-temperature storage characteristics, and also poor in terms of cycle characteristic compared to those of the batteries of Examples 1-6 (which were each prepared by using a positive electrode composition obtained by mixing appropriately heat-treated particles).

A battery for evaluation prepared by using a positive electrode composition of Comparative Example 1 (which was obtained without heat-treating titanium boride particles) is poor in charge-discharge characteristics compared to those of batteries for evaluation prepared by using a positive electrode composition of Examples 1-6 and Comparative Examples 2-5 (which were obtained by mixing heat-treated particles).

As demonstrated so far, in order to obtain a positive electrode composition that allows the resultant battery to exhibit a charge-discharge characteristic, high-temperature storage characteristics, and a cycle characteristic entirely and sufficiently when charged with a high voltage, it is necessary to mix heat-treated particles heat-treated at an appropriate temperature with a positive electrode active material at an appropriate ratio.

Using a positive electrode composition for a non-aqueous secondary battery according to the present embodiment of the disclosure can yield a non-aqueous secondary battery superior in charge-discharge characteristics, high-temperature storage characteristic, and cycle characteristic when charged with a high voltage. For this reason, the resulting non-aqueous secondary battery is suitable for use in large devices, such as electric vehicles, that require high output and high energy density.

It is to be understood that although the present disclosure has been described with regard to preferred embodiments thereof, various other embodiments and variants may occur to those skilled in the art, which are within the scope and spirit of the disclosure, and such other embodiments and variants are intended to be covered by the following claims.

All publications, patent applications, and technical standards mentioned in this specification are herein incorporated by reference to the same extent as if each individual publication, patent application, or technical standard was specifically and individually indicated to be incorporated by reference.

What is claimed is:
1. A positive electrode composition for a non-aqueous secondary battery, comprising:
   titanium boride particles; and
   a positive electrode active material comprising lithium transition metal complex oxide particles that comprise nickel in a composition and have a layered structure, wherein:
     the titanium boride particles comprise an oxygen component in a content of greater than or equal to 1.5 wt % and less than or equal to 2.9 wt %; and
     a content of the titanium boride particles relative to the lithium transition metal complex oxide particles is less than or equal to 1.5 mol % in titanium equivalent terms,
   wherein the lithium transition metal complex oxide particles and the titanium boride particles are each present as substantially independent particles in the positive electrode composition, and wherein the titanium boride particles are not fused nor integrally sintered with the lithium transition metal complex oxide particles.

2. The positive electrode composition according to claim 1, wherein the lithium transition metal complex oxide has a composition represented by formula (1):

$$Li_aNi_{1-x-y-z}Co_xMn_yM^1_zM^2_wO_2 \quad (1),$$

wherein $1.00 \leq a \leq 1.50$, $0.00 \leq x \leq 0.50$, $0.00 \leq y \leq 0.50$, $0.00 \leq z \leq 0.15$, $0.000 \leq w \leq 0.020$, and $x+y+z \leq 0.70$;

$M^1$ is at least one element selected from the group consisting of Al and Mg; and $M^2$ is at least one element selected from the group consisting of Ti, Zr, W, Ta, Nb, and Mo.

3. The positive electrode composition according to claim 2, wherein $0.05 \leq x \leq 0.35$.

4. The positive electrode composition according to claim 2, wherein $0.20 \leq x+y+z \leq 0.60$.

5. The positive electrode composition according to claim 2, wherein $1.05 \leq a \leq 1.25$.

6. The positive electrode composition according to claim 1, wherein the content of the titanium boride particles relative to the lithium transition metal complex oxide particles is greater than or equal to 0.3 mol % in titanium equivalent terms.

7. The positive electrode composition according to claim 1, wherein the content of the titanium boride particles relative to the lithium transition metal complex oxide particles is greater than or equal to 0.5 mol % and less than or equal to 1.0 mol % in titanium equivalent terms.

8. The positive electrode composition according to claim 1, wherein the content of the oxygen component in the titanium boride particles is greater than or equal to 1.6 wt % and less than or equal to 1.8 wt %.

* * * * *

UNITED STATES PATENT AND TRADEMARK OFFICE
CERTIFICATE OF CORRECTION

PATENT NO. : 11,264,612 B2
APPLICATION NO. : 16/524477
DATED : March 1, 2022
INVENTOR(S) : Keisuke Fujihara It is certified that error appears in the above-identified patent and that said Letters Patent is hereby corrected as shown below:

In the Claims

Column 15, Line 6 change "$1.00 \leq a \leq 1.50, 0.00\ x \leq 0.50, 0.00 \leq y \leq 0.50, 0.00 \leq z \leq 0.15,$" to --$1.00 \leq a \leq 1.50, 0.00 \leq x \leq 0.50, 0.00 \leq y \leq 0.50, 0.00 \leq z \leq 0.15,$--

Signed and Sealed this
Thirty-first Day of May, 2022

Katherine Kelly Vidal
*Director of the United States Patent and Trademark Office*